United States Patent

[11] 3,562,545

| [72] | Inventors | Tibor Rubner<br>Pittsburgh, Pa.;<br>Andre Wavre, Monroeville, Pa.; John H.<br>Bednarek, Murrysville, Pa. |
|---|---|---|
| [21] | Appl No | 695,684 |
| [22] | Filed | Jan. 4, 1968 |
| [45] | Patented | Feb. 9, 1971 |
| [73] | Assignee | Westinghouse Electric Corporation<br>Pittsburgh, Pa.<br>a corporation of Pennsylvania |

[54] AUTOMATIC GENERATOR SYNCHRONIZING AND CONNECTING SYSTEM AND SYNCHRONIZER APPARATUS FOR USE THEREIN
11 Claims, 7 Drawing Figs.

| [52] | U.S. Cl. | 307/87, 307/84 |
|---|---|---|
| [51] | Int. Cl. | H02j 3/00 |
| [50] | Field of Search | 307/84, 85, 86, 87, 57, 43, 48, 49, 50, 64, 44, 51, 72, 73, 74, 75 |

[56] References Cited
UNITED STATES PATENTS
3,343,001  9/1967  Grimsdale et al............  307/87

*Primary Examiner*—Robert K. Schaefer
*Assistant Examiner*—H.J. Hohauser
*Attorneys*—A.T. Stratton, C.L. Mc Hale and M.I. Hull ABSTRACT: The synchronizing system includes a voltage acceptor having an overvoltage-undervoltage detector which measures the voltage of the oncoming generator and the voltage on the bus and readies a circuit for operation when these voltages are within permissible limits. Further, a voltage matcher is provided to cause the voltages to come within acceptable limits. A speed matcher is used to change the frequency of the bus. A synchronizer gives a closing signal to a circuit breaker at a definite time (corresponding to the circuit breaker closing time) before the two voltages are in phase.

3,562,545

WITNESSES:
Leon M. Garman
Theodore F. Wrobel

INVENTORS
Tibor Rubner, Andre Wavre
and John H. Bednarek.
BY Maury I. Heels
ATTORNEY

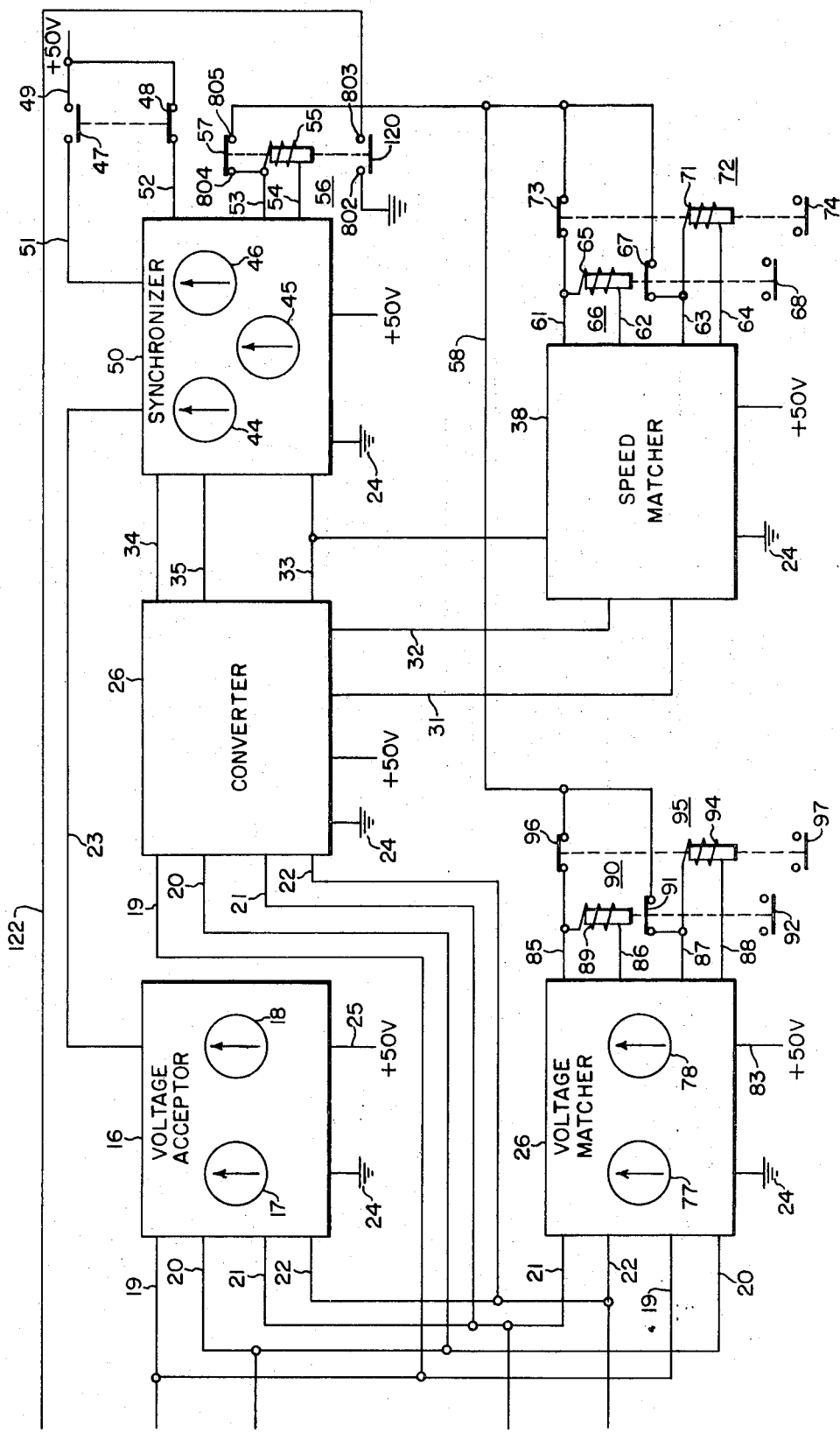

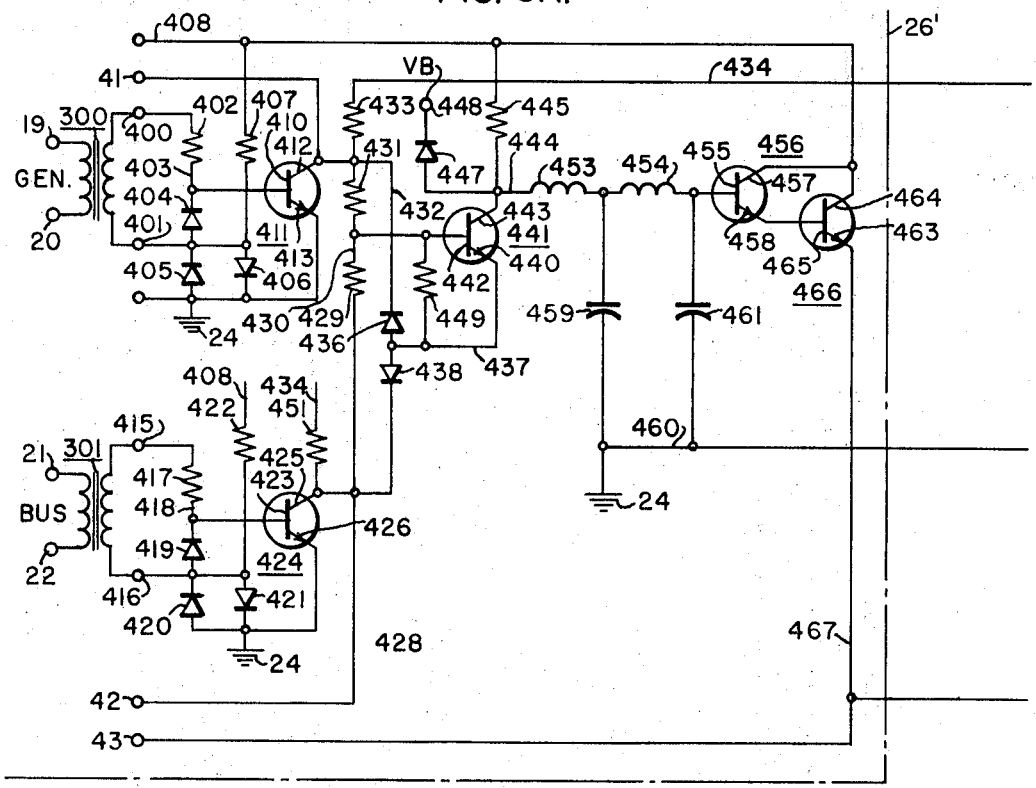
FIG. 3A.
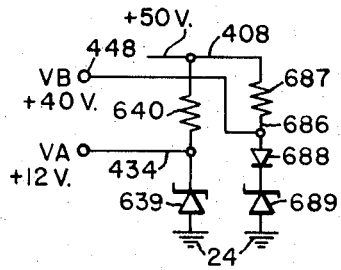
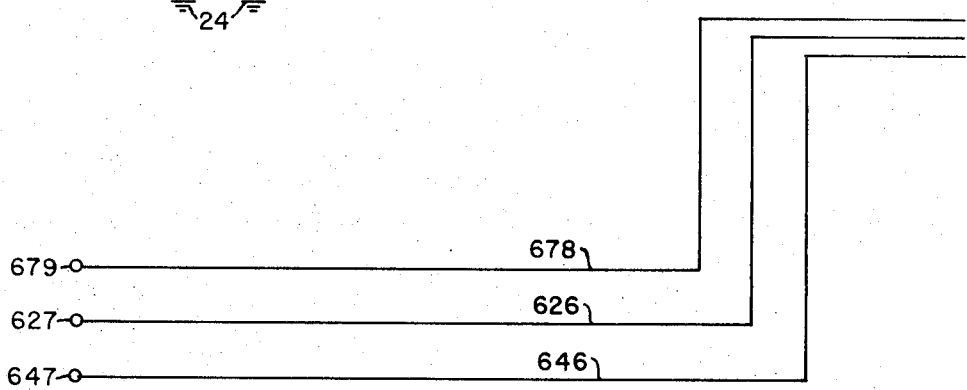

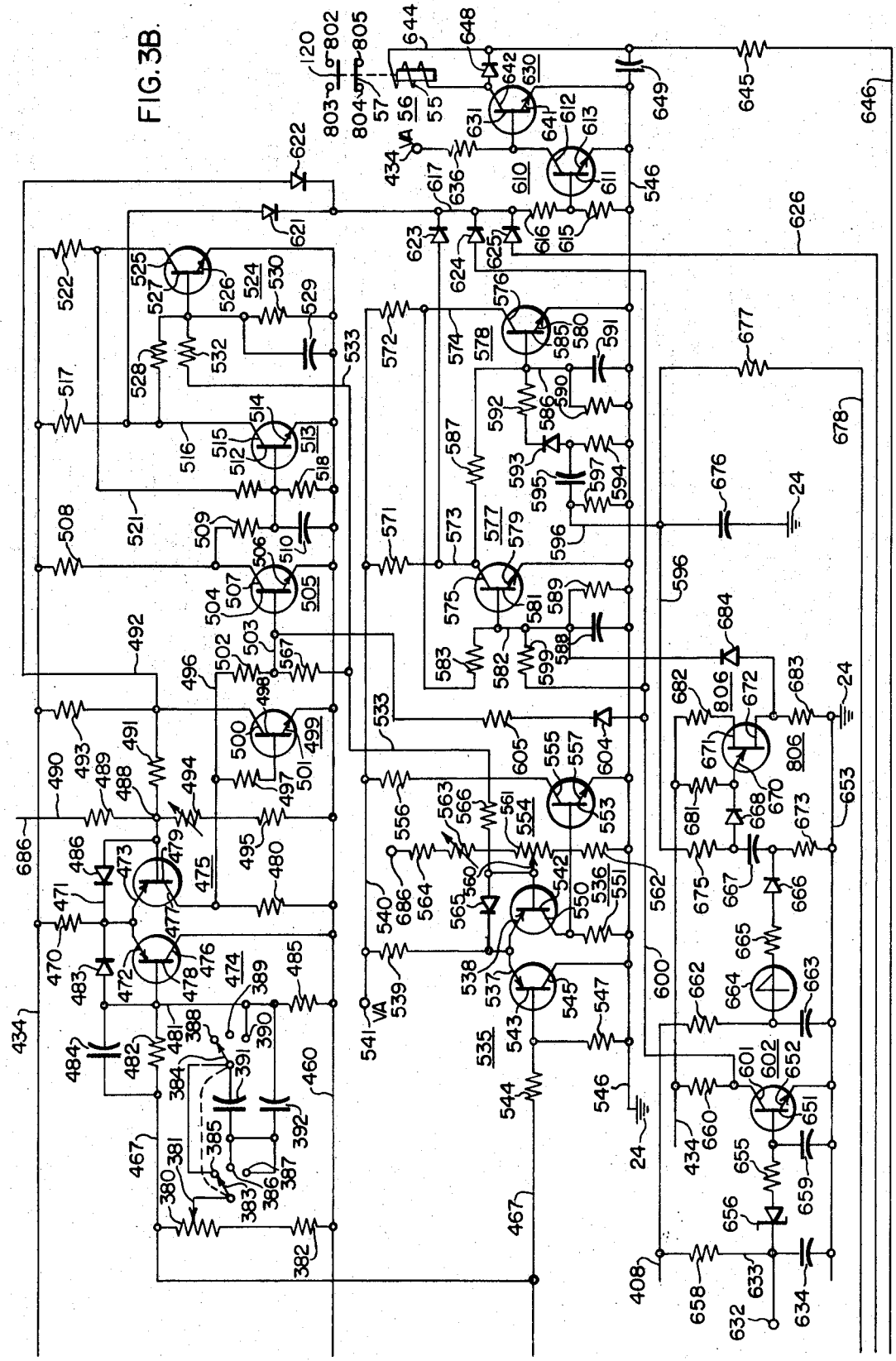

AUTOMATIC GENERATOR SYNCHRONIZING AND CONNECTING SYSTEM AND SYNCHRONIZER APPARATUS FOR USE THEREIN

CROSS REFERENCE TO RELATED APPLICATIONS

A voltage acceptor including the overvoltage-undervoltage detector employed with the present system is shown, described and claimed in the copending application of Tibor Rubner for "Voltage Acceptor Circuit and Overvoltage-Undervoltage Detector For Use Therein," Ser. No. 695,020, filed Jan. 2, 1968. The generator speed matcher employed in the present system is shown, described and claimed in the copending application of Francis T. Thompson and Tibor Rubner for "Generator Speed Matcher Using Direct Sampling," Ser. No. 695,021, filed Jan. 2, 1968. The voltage matcher employed in the system is described and claimed in the copending application of Tibor Rubner et al. for "Solid State Voltage Matcher and Voltage Difference Detector for Use Therein," Ser. No. 695,026, filed Jan. 2, 1968. All of the aforementioned copending applications are assigned to the assignee of the instant invention.

BACKGROUND OF THE INVENTION

1. Field of the Invention

The invention relates to a system and apparatus for ascertaining the voltage relationships between a bus and an oncoming generator to be connected in parallel with the generator exciting the bus, for ascertaining the magnitudes and relative frequencies of the voltages and the phase relationships and creating the necessary voltage and frequency relationships and connecting the generator to the bus at the proper instant. Such devices are generally referred to as synchronizers although additional circuitry may be employed.

2. Description of the Prior Art

One such prior art synchronizer is shown on page 518 of a work entitled "Theory of Alternating Current Machinery" by Langsdorf, 2nd ed., McGraw-Hill, 1955, the synchronizer being the well-known Westinghouse Automatic Synchronizer.

As previously stated it is generally necessary to compare the phases of the two voltages, and one patent directed to a phase detector is entitled "Phase Detector Using Zener Diode Bridges and a Summing Network," U.S. Pat. No. 3,213,362, issued Oct. 19, 1965 to S.D. Silliman et al. U.S. Pat. No. 3,069,555 is for an "Automatic Paralleling System," issued Dec. 18, 1962 to L.L. Kessler.

An "Automatic Paralleling System" is described in the copending application of William W. Billings et al., Ser. No. 647,446, filed Jun. 20, 1967, and assigned to the assignee of the instant invention.

The literature of the art describes several prior art automatic synchronizing equipments, including an article entitled "Automatic Check Synchronizing Equipment Using Static Relaying Principles" by C. Adamson and O.P. Mosland, The Institution of Electrical Engineers, Paper No. 3567, Aug. 1961; and an article entitled "Automatic Control of Hydroelectric Generating Stations" by M.J. Brown and W.A. Derr, AIEE Transactions, Volume 66, 1947, pp. 343—355.

SUMMARY OF THE INVENTION

The system includes a voltage acceptor having the bus voltage and the generator voltage applied thereto, includes an overvoltage-undervoltage detector, which, selectively, according to the embodiment thereof employed, provides an output signal (the DC supply voltage or a portion thereof) when the voltages of the bus and generator are sufficiently close so that the generator may be connected to the bus, or according to another embodiment thereof supplies a lockout signal when the generator and bus voltages are not sufficiently close for the generator to be connected to the bus. When the two voltages are sufficiently far apart and differ sufficiently from a "center" voltage so that the generator may not be connected to the bus, a lockout signal is applied to a synchronizer, disabling the synchronizer and preventing an output signal from the synchronizer which would close a circuit breaker or breakers to connect the generator to the bus.

Further, a converter circuit is employed having the bus and generator voltages applied thereto, the converter circuit providing a squared bus voltage and a squared generator voltage which are applied to a speed matcher circuit, and further the converter creates a phase difference signal which is applied to both the speed matcher circuit and the synchronizer. The speed matcher circuit generates in the alternative a decrease speed signal or an increase speed signal depending upon the frequency relationship of the bus and generator voltages. Further, a voltage matcher circuit is employed having the generator and bus voltages applied thereto for alternatively generating a "raise" voltage signal or a "lower" voltage signal. When all of the conditions exist for proper shunt connection the synchronizer circuit supplies an energizing current to the circuit breaker a predetermined time in advance of the correct phase condition, in accordance with the intrinsic closing time of the circuit breaker.

BRIEF DESCRIPTION OF THE DRAWINGS

FIGS. 1A and 1B taken together are a block diagram of the complete system showing the units thereof, i.e., the voltage acceptor, converter, synchronizer, voltage matcher, and speed matcher, and the various controls of a major nature employed by an operator of the system.

FIGS. 3A and 3B taken together comprise a schematic electrical circuit diagram of the converter and synchronizer.

DESCRIPTION OF THE PREFERRED EMBODIMENTS

Figure 1A:
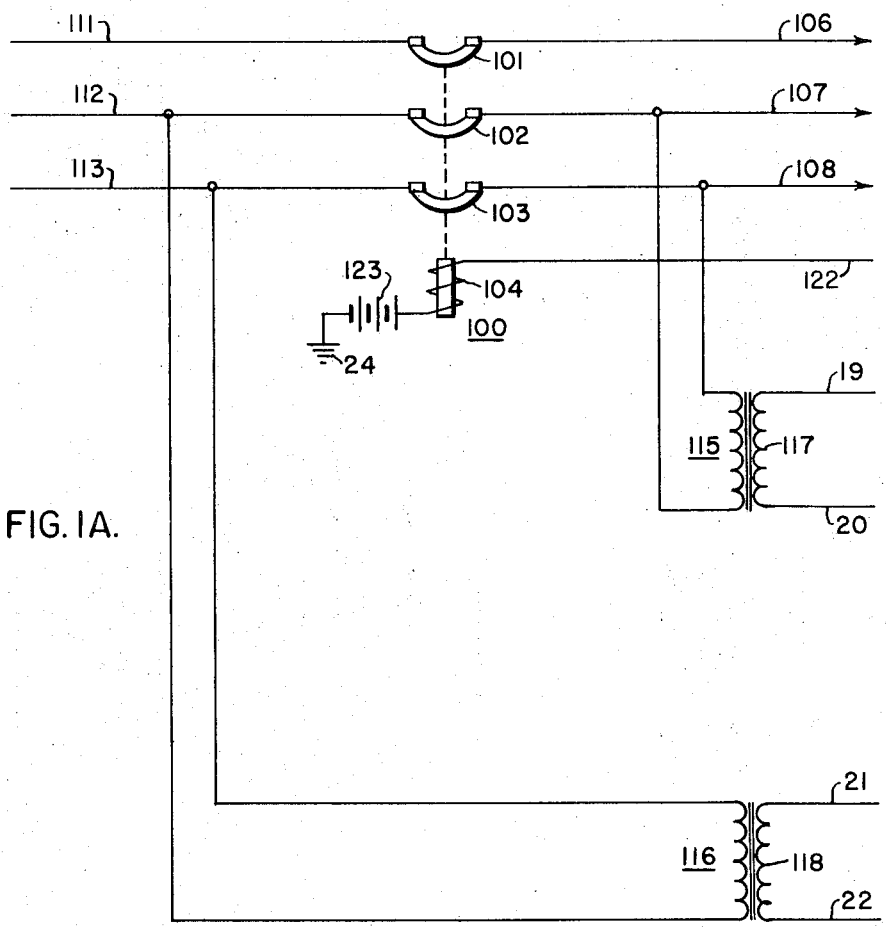

Particular reference is made now to FIGS. 1A and 1B. The block generally designated 16 is a voltage acceptor including an overvoltage-undervoltage detector, as described and claimed in the copending application of Tibor Rubner, Ser. No. 695,020, filed Jan. 2, 1968, and assigned to the assignee of the instant invention. In that copending application, two schematic circuit diagrams suitable for use in the block 16 are shown, one of these schematic electrical circuit diagrams including two variable resistors, or potentiometers, one for adjusting the value of the base or "center" voltage at which it is desired synchronization take place, for example, at a selected value between 110 and 125 volts, for example 120 volts, and one of these potentiometers adjusting the range, or the tolerance from the base voltage, at which connection may be made, this range being for example from 0 to 20 volts. The respective variable resistor controls are indicated at 17 and 18. The leads 19 and 20 are connected to the secondary 117 of a potential transformer generally designated 115 the primary of which is connected across one phase of the generator, conductors 107 and 108. Leads 21 and 22 are connected to the secondary 118 of a potential transformer generally designated 116 the primary of which is energized from a corresponding phase of the bus, conductors 112 and 113. The output signal of the voltage acceptor is developed on lead 23 with respect to ground 24, and lead 25 is connected to the positive terminal of a source of direct current potential which may be 50 volts with respect to ground. The source of potential is not shown for simplicity of illustration.

There is shown at 26 a converter block, a schematic electrical circuit diagram of which is shown in a portion of FIG. 3A. Leads 19 and 20 are connected to the generator transformer, and leads 21 and 22 are connected to the bus transformer. By way of output leads 31, 32 and 33, three signals are supplied from the converter to a speed matcher circuit indicated by block 38. The signal on lead 31 may be a squared generator voltage obtained from terminal 41 in FIG. 3A. The signal on lead 32 may be a squared bus voltage obtained from terminal 42, FIG. 3A, and the signal on lead 33 is a composite signal representative of the phase relationships between the bus and generator voltages and may be obtained from terminal 43, FIG. 3A. Leads 34 and 35, FIG. 1A may be +40 volt and +12 volt supply leads, and may correspond to leads 686 and 434 respectively, FIGS. 3A—3B.

Synchronizer 50 has output leads 53 and 54 connected to the winding 55 of a relay generally designated 56, which winding when deenergized causes armature 57 to close a circuit between lead 53 and lead 58, and as will be seen from FIGS. 3A—3B, +50 volts is applied to lead 53 through an RC filter, lead 52 and armature 48. Lead 51 is connected to the +50volt supply through armature 47 and lead 49. Armature 47 represents a normally open auxiliary contact of circuit breaker 100 and provides intelligence needed for preventing circuit breaker pumping as will be more fully described hereinafter. Lead 52 is seen to be connected to the +50-volt supply through armature 48. Armature 48 represents a normally closed auxiliary contact of circuit breaker 100. This last-mentioned auxiliary contact is used to disable the synchronizer and stop speed matching and voltage matching actions once circuit breaker 100 is closed. The synchronizer 50 is seen to include three controls shown at 44, 45 and 46. Control 44 is an advance angle control, which may correspond to potentiometer 561, FIG. 3B, and be calibrated in a range from 0—40°. Control 46 is a breaker closing time control and, may correspond to potentiometer 380, while multiplier 45 may correspond to switch arms 383 and 384, and capacitors 391 and 392, FIG. 3B.

The operation of the aforementioned speed matcher 38 will be more fully explained hereinafter, and still more fully explained in the aforementioned copending patent application. It is seen, however to have output leads 61, 62, 63 and 64, leads 61 and 62 being connected to winding 65 of a relay generally designated 66 having armatures 67 and 68, armature 67, when the circuit is closed therethrough, connecting lead 63 to lead 58 which is connected to +50 volts through armature 57, aforementioned filter contained in block 50, lead 52 and armature 48. Leads 63 and 64 are connected across winding 71 of a relay generally designated 72 having armatures 73 and 74, the circuit when closed through armature 73 connecting lead 61 to lead 58 which is connected to +50 volts as aforementioned.

The system of FIG. 1A—1B also includes a voltage matcher shown at block 26, having controls 77 and 78 which include a voltage difference adjustment and a pulse duration control. A suitable voltage matcher is described and claimed in the copending patent application of Rubner and Bednarek. Input leads 19 and 20 are connected to the generator transformer and input leads 21 and 22 are connected to the bus transformer. Power supply lead 83 is connected to the positive terminal of a source of potential, not shown for convenience of illustration, which may be of the order of 50 volts having the negative terminal thereof connected to ground. Output leads 85 and 86 are connected to the winding 89 of a relay generally designated 90 having armatures 91 and 92. Armature 91, when the circuit is closed therethrough, connects output lead 87 to the aforementioned lead 58 which is connected to +50 volts as aforementioned. The aforementioned output lead 87 and output lead 88 are connected to winding 94 of a relay generally designated 95 having armatures 96 and 97. Armature 96, when the circuit is closed therethrough, connects lead 85 to the aforementioned lead 58 which is connected to +50 volts in the aforementioned manner.

When synchronizer 50 energizes the winding 55 of relay 56, the circuit is closed through armature 120, by way of lead 122, to energize breaker closing coil 104 from source 123.

It is seen that the circuit breaker generally designated 100 has three contact circuit closing members or armatures 101, 102, 103 which operate together when winding 104 is energized to connect three phase lines 106, 107 and 108, which are connected to the oncoming generator, to energized buses 111, 112 and 113 respectively. As aforementioned, two single phase potential transformers are shown at 115 and 116, the primary of transformer 115 being connected across a selected phase of the three phase generator, in the illustration shown the phase of conductors 107 and 108, and the primary of the other potential transformer 116 is connected across the corresponding phase of the three phase bus, in this case across conductors 112 and 113. Secondary 117 of transformer 115 provides a voltage which varies with variations in the voltage between leads 107 and 108, and secondary 118 of transformer 116 provides a voltage which varies with variations in the voltage between the buses 112 and 113.

Particular reference is made now to FIGS. 3A and 3B which taken together comprise a schematic electrical circuit diagram of the converter and synchronizer shown at blocks 26 and 50, FIG. 1B. Generally that part of the circuit of FIG. 3A enclosed within the dashed line designated 26' corresponds to the circuit of block 26 of FIG. 1A. Terminals 400 and 401 are connected to the secondary of an isolation transformer generally designated 300 the primary of which is connected to leads 19 and 20. Terminals 400 and 401 have connected thereacross in series resistor 402, lead 403 and diode 404. Terminal 401 has a pair of parallel diodes 405 and 406 connected therefrom to ground 24. Terminal 401 is connected by way of resistor 407 to +50 volt lead 408. The aforementioned lead 403 is connected to the base 410 of the transistor generally designated 411 having collector 412 and emitter 413.

Terminals 415 and 416 are connected to the secondary of an isolation transformer generally designated 301 the primary of which is connected to bus leads 21 and 22. Terminals 415 and 416 have connected thereacross resistor 417, lead 418 and diode 419 all in series. Terminal 416 is connected by way of parallel diodes 420 and 421 to ground 24; terminal 416 is connected by way of resistor 422 to 50 volt line 408, and lead 418 is connected to the base 423 of a transistor 424 having collector 425 and emitter 426. Emitter 426 is directly connected to ground 24. Collector 425 is connected to lead 428 which is connected to terminal 42 and is connected by way of resistor 429, lead 430, resistor 431 and lead 432 to the aforementioned collector 412 of transistor 411. Lead 432 is connected to the aforementioned terminal 41. Lead 432 and collector 412 are further connected by way of resistor 433 to lead 434 which may be of a potential +12 volts above ground. An additional parallel path exists between lead 432 and lead 428 by way of diode 436, lead 437 and diode 438. Lead 437 is directly connected to the emitter 440 of an additional transistor 441 having a base 442 and a collector 443 connected by way of lead 444 and resistor 445 to the aforementioned 50 volt lead 408. Lead 444 and collector 443 are further connected by way of diode 447 to a terminal 448 designated VB which may be at a potential +40 volts above ground. Resistor 449 is connected between base 442 and emitter 440.

The aforementioned collector 425 of transistor 424 is connected by way of resistor 451 to +12 volt supply lead 434.

Lead 444 and the aforementioned collector 443 of transistor 441 are further connected by way of series-connected inductors 453 and 454 to the base 455 of an additional transistor 456 having a collector 457 and an emitter 458. The junction between inductors 453 and 454 is connected by way of capacitor 459 and lead 460 to ground 24, and the junction between inductor 454 and base 455 is connected by way of capacitor 461 to the aforementioned lead 460 and ground 24.

Transistor 456 is connected to an additional transistor 466 to comprise a Darlington amplifier circuit, emitter 458 of transistor 456 being connected to the base 465 of transistor 466, collector 457 of transistor 456 being connected to the collector 464 of transistor 466 and both of the collectors being connected to the aforementioned 50 volt supply lead 408, while emitter 463 of transistor 466 is connected to lead 467 and further to terminal 43 for supplying a signal to the speed matcher and synchronizer, lead 467 corresponding to lead 33, FIG. 1B.

Figure 4:
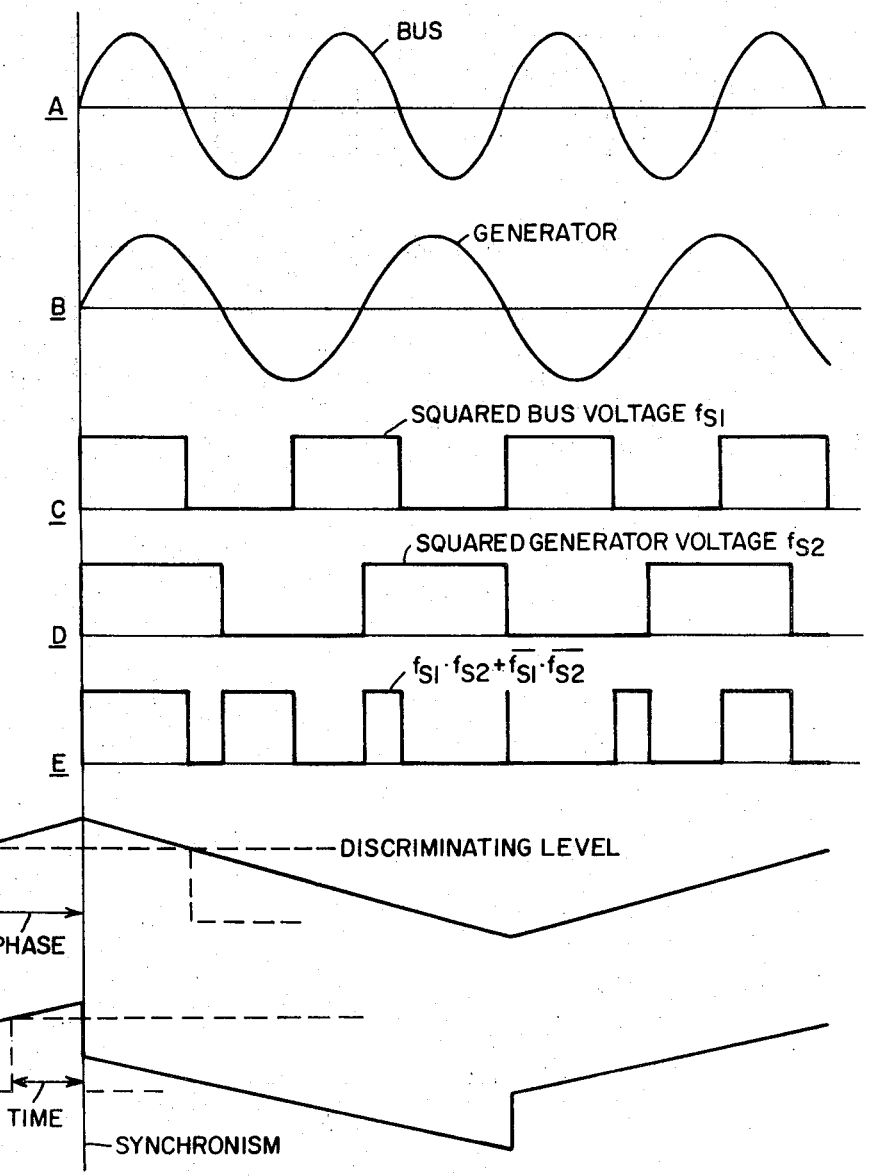
FIG. 4 is a series of graphs or curves illustrating the operation of the synchronizer and the converter.

Summarizing briefly, terminal 41 of FIG. 3A may have connected thereto a lead corresponding to lead 31, FIG. 1B for supplying a squared generator signal, and terminal 42 may have connected thereto a lead corresponding to lead 32, of FIG. 1B, for supplying a squared bus signal. Further, the two square waves of constant amplitudes but different frequencies are mixed and filtered in a portion of the circuit of FIG. 3A including transistors 441, 456 and 466 and associated circuitry, so that a phase difference waveform signal, which may correspond to Curve F, FIG. 4, is obtained which signal is supplied to terminal 43, which may connect to lead 33, FIG. 1B.

The aforementioned lead 434, which may correspond to the lead 35, FIG. 1B, is seen to be connected by way of resistor 470 and lead 471 to the emitters 472 and 473 of a pair of transistors generally designated 474 and 475 having collectors 476 and 477 respectively and bases 478 and 479 respectively. Collector 476 is directly connected to aforementioned lead 460, whereas collector 477 is connected by way of lead 496 and resistor 480 to lead 460. Base 478 of transistor 474 is connected by way of lead 481 and resistor 482 to the aforementioned lead 467. Diode 483 interconnects emitter 472 and base 478, while resistor 482 has capacitor 484 connected thereacross. The aforementioned lead 481 has resistor 485 connected therefrom the lead 460.

As previously stated in connection with FIG. 1A, the synchronizer controls include a breaker closing time control, which may be calibrated from 0.10 to 0.20 seconds, and a multiplier therefor, which may give X1, X2, and X4. To this end, potentiometer 380 and resistor 382 in series therewith are connected between leads 467 and 460. The potentiometer has arm 381 thereof connected to one arm 383 of a double pole, triple throw switch having an additional arm 384 ganged to arm 383 for movement therewith. Arm 383 has contacts 385, 386 and 387 associated therewith, while arm 384 has contacts 388, 389, and 390 associated therewith. Contact 385 is connected to arm 384 and to one terminal of capacitor 391 which has the other terminal connected to contacts 386 and 387, which are connected to one terminal of capacitor 392 which has the other terminal connected to lead 481. Capacitors 391 and 392 may be 2 microfarads each. In accordance with the setting of the switch, arm 381 of potentiometer 380 is connected by way of a capacity of 1 microfarads, 2 or 4 microfarads, to lead 481.

Diode 486 is connected between emitter 473 and base 479 of transistor 475. The aforementioned base 479 of transistor 475 is connected by way of lead 488 and resistor 489 to +40 volt lead 686. The lead 488 is further connected by way of resistor 491, lead 492 and resistor 493 to the aforementioned lead 434. Lead 488 is still further connected by way of variable resistor 494 and resistor 495 to aforementioned lead 460.

The aforementioned collector 477 of transistor 475 is connected by way of lead 496 and resistor 497 to the base 498 of a further transistor generally designated 499 having a collector 500 directly connected to the aforementioned lead 492, and having an emitter 501 directly connected to the aforementioned lead 460. The aforementioned lead 496 is also connected by way of resistor 502 and lead 503 to the base 504 of a further transistor generally designated 505 having an emitter 506 directly connected to lead 460 and having a collector 507 connected by way of resistor 508 to the aforementioned lead 434. Collector 507 is further connected by way of series connected resistor 509 and capacitor 510 to lead 460, and the junction between resistor 509 and capacitor 510 is further connected to the base 512 of a still further transistor generally designated 513 having emitter 514 thereof directly connected to lead 460 and having the collector 515 thereof connected by way of lead 516 and resistor 517 to the aforementioned lead 434. Base 512 has resistor 518 connected therefrom to lead 460, and base 512 is further connected by way of resistor 520, lead 521 and resistor 522 to the aforementioned lead 434.

A still further transistor generally designated 524 includes a collector 525 connected to the aforementioned lead 521, an emitter 526 connected to the aforementioned lead 460, and a base 527 connected by way of resistor 528 to the aforementioned lead 516. Base 527 is further connected by shunt capacitor 529 and resistor 530 to lead 460, and base 527 is further connected by way of resistor 532 to lead 533 to form a further circuit portion to be traced in detail hereinafter.

An additional pair of transistors 535 and 536 have emitters 537 and 538 thereof respectively connected together and connected by way of resistor 539 to lead 540 and terminal 541, connected to +12 volt lead 434. The base 543 of transistor 535 is connected by way of resistor 544 to the aforementioned lead 467, and the collector 545 of transistor 535 is connected to lead 546 and thence to ground 24. Resistor 547 is connected between lead 546 and the aforementioned base 543.

The collector 550 of transistor 536 is connected by way of resistor 551 to the aforementioned lead 546 and is also directly connected to the base 553 of an additional transistor generally designated 554 having a collector 555 connected by way of resistor 556 to the aforementioned lead 540, and having an emitter 557 directly connected to lead 546.

The aforementioned transistor generally designated 536 also has a base 542 connected to the arm 560 of a potentiometer 561 having one end thereof connected by way of resistor 562 to lead 546, and having the other end thereof connected by way of variable resistor 563 and resistor 564 to lead 686 which may be at a potential +40 volts above ground. A diode 565 is connected from arm 560 to the emitters 537 and 538, and the aforementioned arm 560 is connected by way of resistor 566 and lead 533 and resistor 567 to the aforementioned lead 503 and the base 504 of transistor 505.

From the aforementioned lead 540, resistors 571 and 572 connect the lead by way of leads 573 and 574 to the collectors 575 and 576 of a pair of additional transistors 577 and 578 respectively having emitters 579 and 580 respectively directly connected to lead 546 with the base 581 of transistor 577 being connected by way of lead 582 and resistor 583 to the aforementioned lead 574. The base 585 of transistor 578 is connected by way of lead 586 and resistor 587 to the aforementioned lead 573.

The aforementioned lead 582 connected to base 581 is connected by way of a parallel capacitor 588 and resistor 589 to lead 546. Lead 586 connected to base 585 is connected by way of parallel resistor 590 and capacitor 591 to lead 546. Further lead 586 is connected by way of resistor 592, diode 593 and resistor 594 to lead 546. The junction between diode 593 and resistor 594 is connected by way of capacitor 595, lead 596 and resistor 597 to lead 546.

The aforementioned base 581 of transistor 577 and lead 582 connected thereto are connected by way of resistor 599 to lead 600 and thence directly to the collector 601 of an additional transistor 602, the purpose of which will become hereinafter more clearly apparent. The lead 600 is connected by way of diode 604 and resistor 605 to lead 503 and the base 504 of transistor 505. The aforementioned lead 582, connected to the base 581 of transistor 577, is connected by way of resistor 599 to lead 600.

An additional transistor 610 is shown having a base 611, collector 612 and emitter 613 directly connected to lead 546. Base 611 is connected by way of resistor 615 to lead 546, and base 611 is connected by way of resistor 616 to lead 617 which is shown connected to the cathodes of five diode rectifiers 621 to 625 inclusive. The anode of diode 621 is connected to lead 516; the anode of diode 622 is connected to lead 492; the anode of diode 623 is connected to lead 573; and the anode of diode 624 is connected to the aforementioned lead 600. The anode of diode 625 is connected by way of lead 626 to a terminal 627.

With reference to diode 625, in the aforementioned copending application of Tibor Rubner for "Voltage Acceptor Circuit And Overvoltage-Undervoltage Detector for Use Therein," there are shown two embodiments. In one of these embodiments when the generator and line voltages are sufficiently close to a selected center voltage and close to each other, so that synchronization is possible and a generator may be connected in parallel with the bus under those conditions the final output transistor conducts in said one embodiment.

When the voltages are not within the required range for synchronization the voltage supply develops a voltage on the output lead and the collector of the final transistor, and this output voltage would be applied by way of terminal 627 and lead 626 to diode 625, and current would flow therethrough with the result, as may be explained in more detail hereinafter, that this voltage on lead 626, when the output transistor of the overvoltage-undervoltage detector is blocked and conditions for synchronization are not favorable, this output voltage passing through diode 625 and operative on the aforementioned transistor 610 prevents output transistor 630 from saturating and therefore output relay 56 and aforementioned circuit breaker 100 of FIG. 1B cannot be energized.

In the other embodiment of the overvoltage-undervoltage detector shown in the aforementioned copending patent application, the final or output transistor is saturated when conditions exist so that synchronization is undesirable. That other embodiment has the output terminal connected to terminal 632, which is connected by way of lead 633 across capacitor 634; the saturated current path through the transistor effectively places a short circuit or shunt circuit through a low resistance across the capacitor 634, bleeding the charge therefrom, with the result that transistor 602 is blocked, diode 624 is forward biased rendering transistor 610 conductive, and output transistor 630 blocked, keeping output relay 56 deenergized thus preventing synchronization.

Capacitor 634 is used as a timing device for preventing synchronization or paralleling for one second after the circuit is first energized.

It will be apparent then that a signal from the overvoltage-undervoltage detector is applied to either terminal 627 or terminal 632 in accordance with the embodiment employed, but that no one signal is applied to both these terminals, and no two signals are applied to them simultaneously.

Diode 625 and lead 626 may be dispensed with where a signal is applied to terminal 632.

The aforementioned transistor generally designated 630 has a base 631 directly connected to collector 612 of transistor 610, said base also being connected by way of resistor 636 to a power supply lead or terminal identified as "VA" which it is seen has a voltage of 12 volts appearing thereacross at lead 434, the voltage being obtained at the junction of resistor 640 and Zener diode 639. Lead 434 and Zener diode 639 are connected to the 50 volt supply lead 408 by way of resistor 640.

The aforementioned transistor generally designated 630 has an emitter 641 directly connected to lead 546 and a collector 642 connected by way of relay winding 55 of relay 56, lead 644, resistor 645, and lead 646 to terminal 647 which is connected to lead 52 of FIG. 1B. Armature 120 of relay 56 when closed completes the circuit between terminals 802 and 803 which may be connected to ground and the circuit breaker winding respectively as shown in FIGS. 1A and 1B. Armature 120 of relay 56 thus initiates synchronization, or paralleling when relay 56 is energized. Armature 57 of relay 56 when closed completes the circuit between terminals 804 and 805 which terminals are connected as shown in FIG. 1B. Armatures 57 and 120 move together. Diode 648 is connected between collector 642 and lead 644, and capacitor 649 is connected between lead 546 and lead 644.

The aforementioned transistor generally designated 602 in addition to collector 601 has a base 651 and an emitter 652 directly connected by way of lead 653 to ground 24. Base 651 is connected by way of resistor 655 and Zener diode 656 to the aforementioned lead 633 and terminal 632. Lead 633 is connected by way of resistor 658 to the aforementioned 50 volt supply lead 408. Capacitor 659 is connected from base 651 to lead 653. The aforementioned collector 601 in addition to being connected to the aforementioned lead 600 is connected by way of resistor 660 to the 12 volt lead 434.

The aforementioned 50 volt supply lead 408 is connected by way of resistor 662 and capacitor 663 to lead 653. The junction between resistor 662 and capacitor 663 is connected by way of a Shockley diode 664, resistor 665, diode 666, capacitor 667 and diode 668 to the emitter 670 of a unijunction transistor having bases 671 and 672. The junction between diode 666 and capacitor 667 is connected by way of resistor 673 to lead 653. The junction between capacitor 667 and diode 668 is connected by way of resistor 675 to the aforementioned lead 596 which has capacitor 676 connected therefrom to ground and which is connected by way of resistor 677 and lead 678 to terminal 679 which is connected to lead 51 of FIG. 1B.

The aforementioned emitter 670 of the unijunction transistor is connected by way of resistor 681 to 12 volt supply lead 434, and base 671 is connected by resistor 682 to the aforementioned 12 volt supply lead 434. The base 672 is connected by way of resistor 683 to ground 24, and the base 672 is connected by way of diode 684 to the aforementioned lead 582 and base 581 of transistor 577.

The aforementioned power supply terminal identified as "VB" has a positive potential of 40 volts with respect to ground thereacross, and is obtained at the junction of resistor 687 and series-connected diode 688 and Zener diode 689.

In the portion of the converter schematic electrical circuit diagram of FIG. 3A which contains the switching circuitry and filters employed for developing a phase difference waveform on lead 467 and at terminal 43, transistors 411 and 424 and their associated circuits produce symmetrical square waves of generator and bus frequency respectively, in accordance with FIG. 4, although it will be understood that they could be oppositely connected if desired. The output signals of these transistors, which could be designated $f_{s1}$ and $f_{s2}$, as shown in FIG. 4 are fed to an exclusive NOR gate for mixing; the exclusive NOR gate which may include transistor 441 and associated circuitry operates in the following way: when both $f_{s1}$ and $f_{s2}$ are logical ones, that is, they are positive, transistor 441 will block and give a logical one output, since diodes 438 and 436 are reverse biased. When both $f_{s1}$ and $f_{s2}$ are logical zeros, that is, they are at ground potential, transistor 441 again blocks (produces a logical one output) since it has no base drive. When either of the signals ($f_{s1}$, $f_{s2}$) is a logical one while the other is a logical zero, transistor 441 will saturate, since base drive is provided either through resistor 431 or resistor 429, and either diode 438 or diode 436 is forward biased. The output is now a logical zero.

Figure 2A:
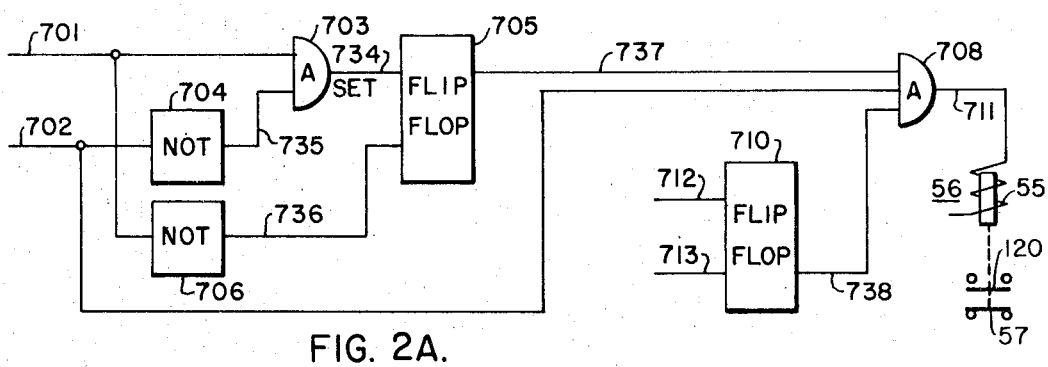
FIGS. 2A and 2B are block diagrams of the synchronizer unit of the system.
Figure 2B:
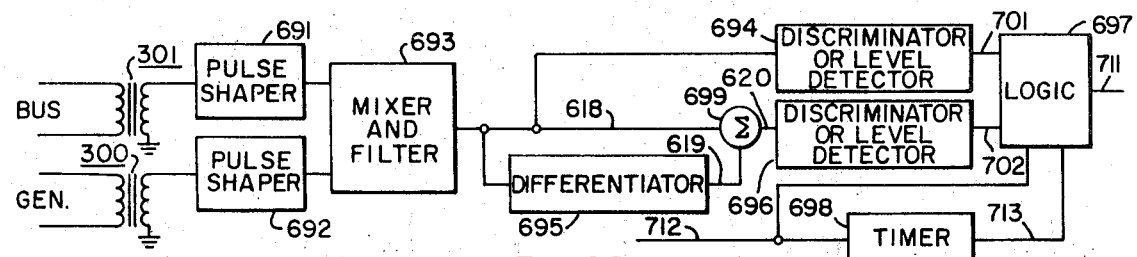

Particular reference is made now to FIGS. 2A and 2B, block diagrams of the synchronizer shown in schematic electrical circuit diagram in FIGS. 3A and 3B.

The sinusoidal bus and generator voltages, obtained from the potential transformers are coupled via isolating transformers 300 and 301 to pulse shapers 691 and 692 respectively. These sinusoidal voltages are represented by waveforms A and B respectively of FIG. 4. The output of pulse shaper 691 is a square wave of constant amplitude having the frequency of the bus voltage, and may be represented by the waveform C of FIG. 4. The output of pulse shaper 692 is a square wave of constant amplitude having the frequency of the generator voltage, and may be represented by the waveform D of FIG. 4. The outputs of pulse shapers 691 and 692 are mixed by transistor 441 and associated circuitry in the circuit of FIG. 3A, the resulting waveform being shown by waveform E of FIG. 4. After mixing, filtering is applied and the waveform F of FIG. 4 results, which is proportional to the average amplitude of Curve E. The mixing and filtering functions are performed by the block designated 693 which may include transistor 441 and associated circuitry, a low pass filter consisting of inductors 453, 454, capacitors 459 and 461, and Darlington circuit composed of transistors 456 and 466. The output of block 693 is thus a triangular voltage of constant amplitude, its frequency being equal to the difference in frequency between the bus and generator voltages. The instantaneous value of the voltage output of block 693 is thus proportional to the instantaneous phase difference between the bus and generator voltages. In this particular embodiment the maximum value of the triangular voltage waveform corresponds to zero degrees phase shift. The triangular voltage output of the block 693, hereinafter referred to as the phase difference waveform and shown by waveform F of FIG. 4 is applied to level detector 694 which produces an output as long as the phase difference waveform exceeds a certain predetermined, adjustable level. Thus, level detector 694 which may include transistors 535, 536 and 554 and associated circuitry can produce an output at a definite phase relationship of the bus and generator voltages. This last-named output may be referred to herein as the phase advance angle signal. The output begins when there is a certain phase relationship and ends when there is a certain phase relationship in accordance with the adjustment of the threshold being set by potentiometer 561. The output of block 693, i.e., the waveform F of FIG. 4 is also applied to a differentiator 695 which may include capacitors 391, 392, resistors 485, 382, potentiometer 380 and capacitor 484. The output of the differentiator is thus a square wave, whose amplitude is proportional to the frequency of the phase difference waveform, i.e., it is proportional to the frequency difference between the bus and generator voltages. The constant of proportionality is adjustable by potentiometer 380 and the switch having arms 383 and 384 and is used to accommodate different breaker closing times. The output of differentiator 695 is not shown in FIG. 4. Block 699 represents a summing operation, so it can be seen that the outputs of block 693 and block 695, i.e., the phase difference waveform and its first derivative are added together algebraically. The output of block 699, i.e., the sum of the phase difference waveform and its first derivative is shown by waveform G of FIG. 4, and is applied to a second level detector or discriminator 696 which may include transistors 472 and 473 and associated circuitry. The amplitude of waveform G of FIG. 4 is not constant but depends on the frequency difference between the bus and generator voltages and the adjustment of the differentiator. The threshold level of level detector 696 is adjusted by variable resistor 494 to a voltage that corresponds to the value of waveform G of FIG. 4 when the bus and generator have equal frequencies, it being understood that waveform G is necessarily a DC level when the frequency difference is zero. It can be shown mathematically that the output of level detector 696 will occur at a definite time before phase coincidence of the bus and generator voltages, independent of the frequency difference between them. This definite time can be adjusted to correspond to the desired breaker closing time by the aforementioned adjustment of the differentiator. Thus the output of level detector 694 begins at a definite phase before phase coincidence of the bus and generator voltages and the output of level detector 696 begins at a definite time before phase coincidence corresponding to the threshold level of level detector 694. Depending on the frequency difference, the output of level detector 694 can begin before or after the output of level detector 696 begins. Generally, the output of level detector 696 appears first if the frequency difference is too high. Thus, there is needed some means for determining which of the two level detectors produces an output first, i.e., whether the frequency difference is too great or not. If the frequency difference is too great synchronization is prevented and if it is not too great synchronization is initiated at the instant an output appears on lead 702. This decision making is performed by the logic circuitry 697, which is shown in more detail in FIG. 2A. When a signal is present on lead 701 but not on lead 702, i.e., the output of level detector 694 occurs first, both inputs of AND gate 703 whose function may be equivalently performed by transistor 505 and associated circuitry will have signals present and it will set the bistable circuit 705 which may include transistors 513 and 524 and associated circuitry. The bistable circuit will remain set as long as an output from level detector 694 is present. Thus when a signal appears on lead 702 corresponding to the output of level detector 696 it can go through the AND gate 708 whose function may be equivalently performed by transistors 610 and 630, diodes 621, 622 and 623 and associated resistors and energize the circuit breaker, i.e., paralleling or synchronization can take place. The bistable circuit 705 is reset as soon as the signal on lead 701 ceases, which occurs at a definite phase after phase coincidence. If the signal on lead 702 occurs before the signal on lead 701, i.e., the frequency difference is too great, the bistable circuit cannot be set as long as the signal on lead 702 is present. Thus synchronization cannot take place, since the signal on lead 737 corresponding to the bistable circuit being set, and the signal on lead 702 do not overlap. Timer 698 which may include unijunction transistor 806 and associated circuitry in conjunction with bistable circuit 710 which may include transistors 577 and 578 and associated circuitry form a breaker antipump circuit. After paralleling has taken place and the circuit breaker closes, a normally open auxiliary contact of the circuit breaker, connected to lead 712 which lead corresponds to terminal 679 of FIG. 3A and lead 51 of FIG. 1B, sets bistable circuit 710 and at the same time initiates the timing periods of the timer, which may be ten seconds. As long as bistable circuit 710 is set synchronization cannot occur as will be obvious to those skilled in the art. If the circuit breaker remains closed for a sufficient time the timer can time out and reset bistable circuit 710, and synchronization can again occur. However, if the circuit breaker opens before the timer had a chance to time out, the bistable circuit 710 cannot be reset and synchronization will be prevented.

Certain further explanation of our invention of a mathematical nature appears in a paper entitled "A High Accuracy Automatic Generator Synchronizing System" by T. D. Rubner, A. Wavre and J. Bednarels, presented at the IEEE Summer Power Meeting, Jul. 9—14, 1967, Paper No. 31 CP 67—488.

We claim:

1. In a generator synchronizing system, in combination, circuit means adapted to be operatively connected to an energized alternating current bus and to an alternating current generator of different frequency for obtaining square waves corresponding to the bus and generator waveforms, the circuit means including means for utilizing the square waves corresponding to the bus and generator waveforms to obtain a triangular phase difference signal and a level detector having the triangular phase difference signal applied thereto, said level detector including threshold value establishing means, said threshold value being attained by said triangular phase difference signal a constant time before phase coincidence irrespective of the frequency difference between the bus and generator voltages, and normally open circuit breaker means interconnecting the bus and generator, said circuit breaker means having an inherent closing time substantially equal to said constant time, the first-named circuit means being operatively connected to the circuit breaker means and applying a closing signal to the circuit breaker means when said threshold value is attained by said triangular phase difference signal.

2. In combination, circuit means adapted to be connected to an alternating current bus and to an oncoming alternating current generator the frequency of which is changing and approaching the frequency of the bus for obtaining two signals the first of said signals occurring at a definite phase before phase coincidence of the bus and generator, the second of said signals occurring at a definite time before phase coincidence, other circuit means for ascertaining which of said signals occurs before the other, a normally open circuit breaker interconnecting the bus and generator, said circuit breaker having a closing coil and a predetermined inherent closing time substantially equal to said definite time before phase coincidence, and means including a source of potential interconnecting the closing soil and the means for ascertaining which of said signals occurs before the other for applying current to the closing coil when the first signal occurs before the second signal.

3. A synchronizing system for use in connecting an oncoming alternating current generator in parallel with an energized alternating current bus wherein a normally open circuit breaker interconnect the bus and generator, said circuit breaker having an inherent closing time after a closing signal is applied thereto, and the generator has means operatively connected thereto for increasing the speed in response to an "increase speed" signal and decreasing the speed in response to a "decrease speed" signal, and the generator has means operatively connected thereto for increasing the voltage in response to an "increase voltage" signal and means for decreasing the voltage in response to a "decrease voltage" signal, in combination, synchronizer circuit means adapted to supply a closing signal to the circuit breaker, converter means operatively connected to the bus and generator for producing a phase difference waveform, speed matcher circuit means operatively connected to the converter means and having the phase difference waveform applied thereto, said speed matcher circuit means being operatively connected to the bus and generator and having applied thereto first and second signals corresponding to the bus frequency and the generator frequency respectively, said speed matcher circuit means utilizing the first and second signals and the phase difference waveform to generate for application to the generator "increase speed" and "decrease speed" signals selectively in accordance with the relative frequencies of said first and second signals, voltage matcher circuit means operatively connected to the bus and generator and selectively generating for application to the generator "increase voltage" and "decrease voltage" signals in accordance with the relative voltages of the bus and generator, voltage acceptor circuit means operatively connected to the bus and generator and to the synchronizer, said voltage acceptor circuit means disabling the synchronizer circuit means until the bus and generator voltages are within an acceptable range of each other and deviate from a selected center voltage by an acceptable amount, the synchronizer circuit means thereafter being readied to supply a closing signal to the circuit breaker, said synchronizer circuit means utilizing the bus and generator frequencies and the phase difference waveform to generate a closing signal for the circuit breaker at a time before phase coincidence of the bus and generator voltages equal to the inherent closing time of the circuit breaker.

4. Apparatus according to claim 3 in which the converter means is additionally characterized as producing square waves from substantially sinusoidal bus and generator waveforms, and said speed matcher circuit means utilizes the square waves together with the phase difference waveform to selectively produce said "increase speed" and "decrease speed" signals for application to the generator.

5. Apparatus according to claim 3 including in addition lockout means in the synchronizer for preventing synchronization if the angle in advance of synchronism at which the circuit breaker closing circuit must be energized exceeds a specific value.

6. Apparatus according to claim 3 in which the circuit breaker is additionally characterized as having auxiliary contacts, and circuit means connecting the auxiliary contacts to the synchronizer, the synchronizer including a circuit for preventing pumping of the circuit breaker.

7. In automatic generator synchronizer apparatus, circuit means adapted to be operatively connected to an energized bus and an oncoming generator for converting the bus and generator voltages to square waves and utilizing said square waves to produce a signal at a definite phase advance angle between bus and generator voltages, and other circuit means for producing an additional signal at a definite time before synchronism in accordance with the inherent closing time of a circuit breaker interposed between the bus and the oncoming generator.

8. Apparatus according to claim 7 including a circuit breaker, and means for supplying a closing signal to the circuit breaker when the phase advance signal proceeds the synchronizing signal.

9. Apparatus according to claim 8 including in addition logic circuitry for ascertaining whether the last named signal occurs before the synchronizing signal.

10. Apparatus according to claim 7 in which the circuit means for producing said additional signal includes means for converting the bus and generator voltages to square waves of constant amplitudes, means for mixing the square waves of constant amplitudes to obtain a true, triangular phase difference waveform, means for applying the phase difference waveform to a differentiator and to a summing circuit, circuit means for applying the output of the summing circuit to the discriminator, said discriminator producing said additional signal at a definite time before phase coincidence of the bus and generator voltages independent of a frequency difference between them.

11. Apparatus according to claim 6 where the circuit for preventing pumping includes a normally open contact on the circuit breaker, timer means and bistable circuit means, said bistable circuit means being set by the circuit breaker thus preventing synchronization, said timer means starting a timing period when the bistable is set and after a predetermined time resetting the bistable circuit means if the circuit breaker remains closed for said predetermined time, the bistable circuit means thus permitting synchronization.